United States Patent [19]
Su

[11] Patent Number: 5,383,043
[45] Date of Patent: Jan. 17, 1995

[54] OMNI-DIRECTIONAL INFRARED SENSING CIRCUIT

[76] Inventor: Chih-Hai Su, No. 88-1, Niu Chuang Li, Shan Hua Chen, Tainan Hsien, Taiwan, Prov. of China

[21] Appl. No.: 37,293

[22] Filed: Mar. 26, 1993

[51] Int. Cl.⁶ .............................................. H04B 10/00
[52] U.S. Cl. ..................................... 359/142; 359/147; 341/176; 340/825.72
[58] Field of Search ............... 359/142, 146, 147, 148, 359/189, 172, 117; 340/825.72; 348/734; 341/176

[56] References Cited

U.S. PATENT DOCUMENTS

| | | | |
|---|---|---|---|
| 4,638,445 | 1/1987 | Mattaboni | 364/424.01 |
| 4,717,913 | 1/1988 | Elger | 359/172 |
| 5,146,210 | 9/1992 | Heberle | 359/142 |

FOREIGN PATENT DOCUMENTS

| | | | |
|---|---|---|---|
| 0132234 | 5/1989 | Japan | 359/189 |
| 5145489 | 6/1993 | Japan | 359/142 |

Primary Examiner—Richard E. Chilcot, Jr.
Assistant Examiner—Kinfe-Michael Negash
Attorney, Agent, or Firm—Woodcock Washburn Kurtz Mackiewicz & Norris

[57] ABSTRACT

An omni-directional infrared sensing circuit includes a plurality of infrared sensors positioned in an different-angled space for receiving external remote control signal, a decoder for checking whether the remote control signal is effective, if positive outputting an effective indicating signal, a multiplexer device connected to the sensors for cyclically allowing one of the sensors to transmit remote control signal, a lock device connected to the multiplexer device responding to the effective indicating signal from the decoder and stop the circulation of the multiplexer device.

1 Claim, 2 Drawing Sheets

OMNI-DIRECTIONAL INFRARED SENSING CIRCUIT

BACKGROUND OF THE INVENTION

This invention relates to an omni-directional infrared sensing circuit.

Infrared sensing circuits are popular in remote controls for use with appliances, such as television sets, video recorders, lights, fans and so on. However, the conventional infrared sensing circuit has its directional limit to a directional range. Therefore, if the infrared source is operated out of the directional range, the infrared sensing circuit can not have any response. It is not convenient to operate a remote control in a specific directional range. A plurality of sensors might work together to achieve an omni-directional function. However, merely introducing some sensors without any control circuit will cause very high noise interference between each sensor. Since each sensor is easy to be affected by the infrared ray, thus noises will exist when these sensors function simultaneously.

SUMMARY OF THE INVENTION

It is an object of the present invention to provide an omni-directional infrared sensing circuit having a plurality of infrared sensors connected to a lock circuit and a multiplexer. These sensors are cyclicly transmitted to decode by the multiplexer and when any of the sensors detects effective infrared signal, the lock circuit will lock the multiplexer, stopping the circulation of the sensors, causing the specific sensor to function only, thus increasing the signal/noise ratio.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
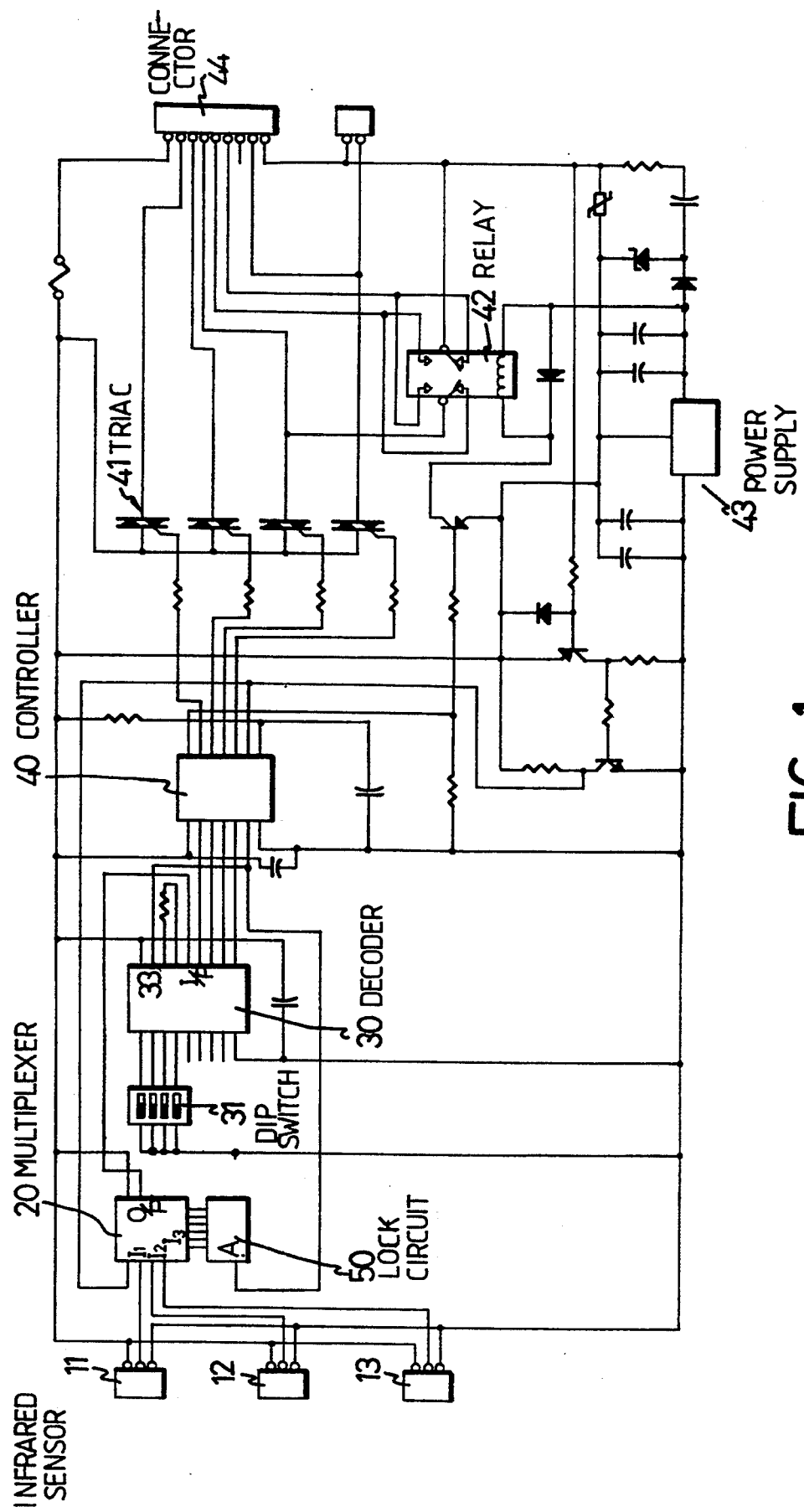
FIG. 1 is a schematic diagram of the present invention.

Referring to FIG. 1, an omni-directional infrared sensing circuit comprises a power supply 43 providing required power for the whole circuit, a plurality of infrared sensors 11, 12, and 13 for receiving the infrared signal from external environment, a dip switch 31 for a user to set a secret code for coping with the secret code already set in the remote control, a decoder 30 providing a plurality of output terminals to transmit output signal to a controller 40. The dip switch 31 and the decoder 30 have to cooperate with a remote control to constitute their secret communication. However, this is well known and not described in detail. The controller 40 drives a plurality of TRIACs 41 and a relay 42 and further control a plurality of appliances (not shown) connected to connector 44. The infrared sensors 11 to 13 are arranged in different directional relation. For example, each sensor may have 120-degree spatial relation with other sensors. Therefore, the sensors together practice an omni-directional detection.

The output terminals of the sensors 11 to 13 are electrically connected to the decoder 30 by means of a multiplexer 20 and a lock circuit 50. The multiplexer 20 has input terminals I1 to I3 connected to the output terminal of each sensor. An output terminal O/P of the multiplexer. 20 is connected to an input terminal I/P of the decoder 30. The multiplexer 20 scans each sensor in turn, such that in any scanning interval, merely a single sensor can transmit its signal to the decoder 30. The lock circuit 50 controls the multiplexer 20 to temporarily stop scanning when the multiplexer 20 scans an effective signal from a specific sensor. The lock circuit 50 has a control input terminal A connected to the output terminal 33 of the decoder 30. When the signal inputted to the decoder 30 is detected to be effective, the latter will change its output signal to temporarily enable the lock function of the lock circuit 50, thus stopping the scanning of the multiplexer 20 and locking the multiplexer 20 in an optimum scanning direction and excluding other sensors to send into other infrared signals to the decoder 30. In the mean time the signal/noise is increased because only one infrared signal is decoded and then inputted into the controller 40.

Figure 2:
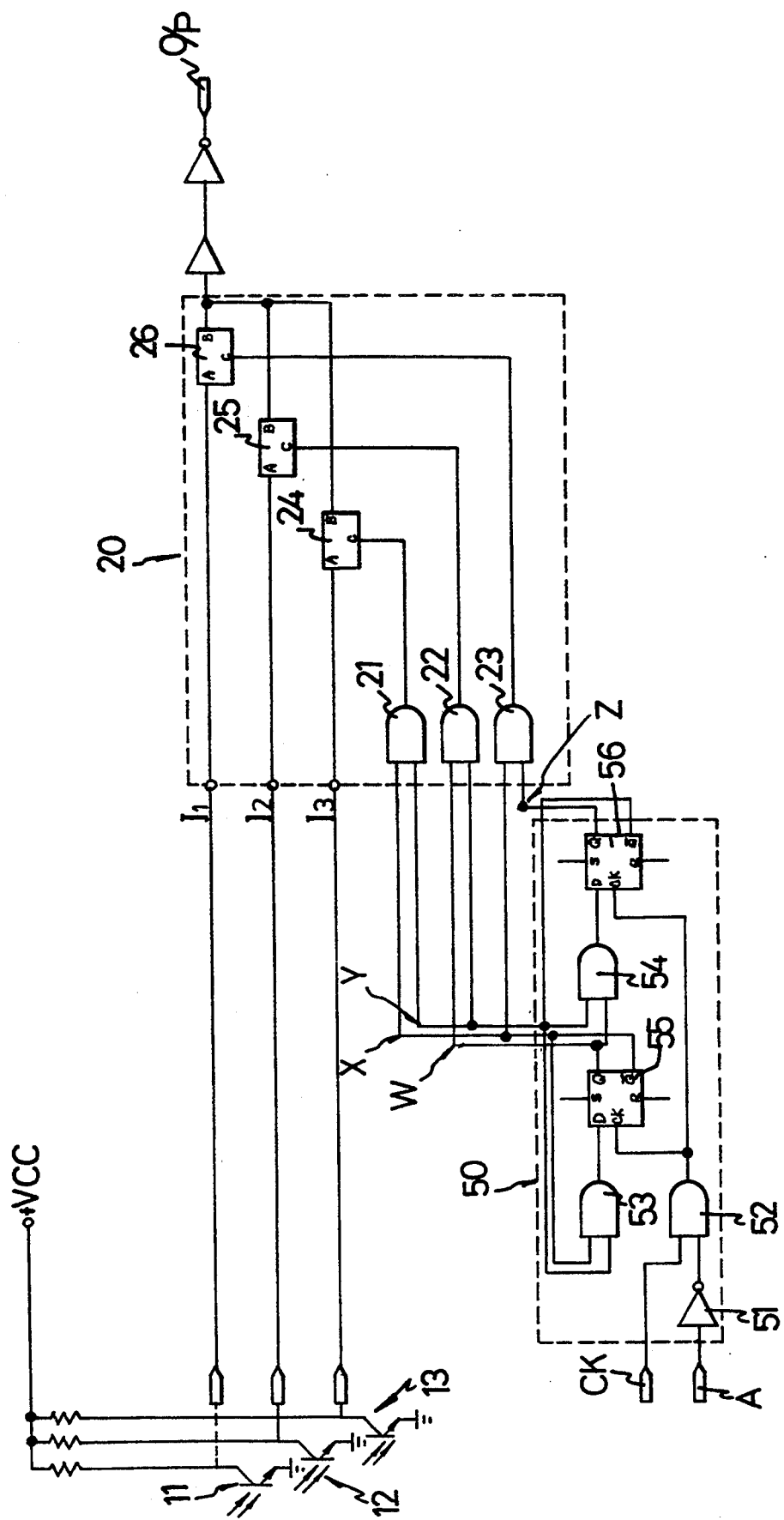
FIG. 2 is a detailed circuit of the multiplexer means and the lock means of FIG. 1.

Referring to FIG. 2, the multiplexer 20 and the lock circuit 50 are illustrated in detail. The multiplexer 20 has a plurality of switches 24, 25, and 26, and corresponding numbers of AND gates 21, 22, and 23. Each AND gate has an output terminal connected to a corresponding control terminal C of a corresponding switch. Each switch 24 to 26 has one input terminal connected to a corresponding sensor 11 to 13. Each switch 24 to 26 has one output terminal connected together and further through amplification and pulse rectification and forming as the output terminal O/P thereof. The lock circuit 50 comprises two flip flops 55, 56 and two AND gates 53, 54 constituting a circular frequency divider counter (actually a divided-by-three frequency divider). Four output terminals W, X, Y, and Z are connected to the input terminal of the AND gates 21 to 23 respectively. Two flip flops 55 and 56 have their clock input terminals connected to a switch constituted by an AND gate 52 and a NOT gate 51. The input terminal A of the NOT gate 51 is assigned to be the control input terminal of the lock circuit 50 and is controlled by the output status of the decoder 30. The system clock CK is inputted into the other input terminal of the AND gate 52. Normally, when no effective remote control signal is received, the lock circuit 50 functions as a counter, thereby actuating the multiplexer 20. When an effective remote control signal is received, the lock circuit 50 stops counting, therefore the multiplexer 20 is locked to communicate with a specific sensor.

Referring to FIGS. 1 and 2 together, when the system does not receive any effective infrared signal, the sensors 11 to 13 are idle, therefore the output terminal 33 of the decoder 30 is in low status thus the input terminal A of the lock circuit is also in low status, via the NOT gate 51 obtaining a high status at an output terminal thereof, and enabling the AND gate 52 to bypass the system clock CK to the flip flops 55, 56. The clock signal CK is divided by three, thus the outputs W, X, Y, and Z each changes its logic level in a divided by three sequence from the frequency of the system clock. At any clock interval, only one of the AND gates 21, 22, 23 has a high status output, thus the switches 24, 25, 26 are turned on and off in turn. The outputs W, X, Y, and Z are via the multiplexer 20 and the AND gates 21 to 23 for cyclically triggering each switch 24 to 26, thus at any time merely one sensor can affect the signal of the output terminal O/P of the multiplexer 20. Therefore the interference noise can be decreased to a relatively low level.

When any one of the sensors 11 to 13 detects remote control signal and the signal is transmitted to the multiplexer 20, thus changing the signal of the output terminal O/P. When the decoder 30 determines the secret code is correct and the signal is effective, the decoder 30 outputs a high status signal to the input terminal A of the lock circuit 50, via the NOT gate 51 and outputs as a low status signal to cut off the path of the clock signal CK and further stops the operation of the divider, which in turn stops the scanning of the multiplexer 20. When the emitting signal stops, the corresponding sensor turns idle again, causing the signal of the output terminal O/P to disappear, which in turn causes the input terminal A of the lock circuit 50 to change its status from high to low, which thus again permits the system clock CK to transmit to the divider and further recover the scanning of the multiplexer 20.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An omni-directional infrared sensing circuit comprising a plurality of infrared sensors arranged in different directions for sensing an external remote control signal from any direction;

a decoder including an input terminal for detecting whether the remote control signal is effective, such that if positive, said decoder changes its output signal at an output terminal;

multiplexer means electrically connected to said infrared sensors and having a corresponding number of switches, each of which has an input terminal connected to a corresponding sensor, an output terminal, and a trigger terminal which when triggered will turn on the switch, each output terminal of each of said switch as being connected together to form an output terminal of the multiplexer means, said output terminal of said multiplexer means being connected to said input terminal of said decoder;

a circular counter with lock function having a number of output terminals, each of which being connected to said trigger terminal of a said corresponding switch via a corresponding one of first AND gates, each of said first AND gates alternately outputting a triggering signal to trigger the corresponding switch in response to counting operation of the circular counter, a control terminal connected to said output terminal of said decoder, a clock terminal receiving external clock signal, and a second AND gate connected to the clock terminal and the control terminal via a NOT gate, such that when any one of said sensors is triggered by an effective remote control signal, said decoder changes its output signal causing said control terminal to change from a normal status to a triggered status thus cutting off the path of the clock to the circular counter and stopping the counting of the circular counter, such that after the remote control signal disappears, the control terminal returns to the normal status thus enabling the counting of the circular counter.

* * * * *